(12) United States Patent
Droll et al.

(10) Patent No.: US 8,328,646 B2
(45) Date of Patent: Dec. 11, 2012

(54) TORSIONAL VIBRATION DAMPER

(75) Inventors: Peter Droll, Karlsruhe (DE); Stefan Jung, Kehl (DE); Craig Kneidel, Massillon, OH (US); Srivatsan Kannan, Hyderabad (IN); Nathan Yensho, Chippewa Lake, OH (US); Thorsten Krause, Buehl (DE); Markus Werner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 217 days.

(21) Appl. No.: 12/703,890

(22) Filed: Feb. 11, 2010

(65) Prior Publication Data
US 2010/0210366 A1 Aug. 19, 2010

(30) Foreign Application Priority Data

Feb. 12, 2009 (DE) .......................... 10 2009 008 670
Sep. 17, 2009 (DE) .......................... 10 2009 042 051

(51) Int. Cl.
*F16F 15/123* (2006.01)

(52) U.S. Cl. ...................................................... 464/68.9

(58) Field of Classification Search ................. 464/66.1, 464/68.1, 68.4, 68.41, 68.9, 68.91; 192/30 V, 192/55.61, 70.17, 204, 213.11, 213.12, 213.21–214.1
See application file for complete search history.

(56) References Cited

U.S. PATENT DOCUMENTS

| | | | | |
|---|---|---|---|---|
| 2,364,988 A | * | 12/1944 | McFarland | 464/68.41 |
| 4,592,460 A | * | 6/1986 | Kittel | 192/70.17 |
| 6,283,864 B1 | * | 9/2001 | Reik et al. | 192/70.17 |

* cited by examiner

*Primary Examiner* — Gregory Binda
*Assistant Examiner* — Josh Skroupa
(74) *Attorney, Agent, or Firm* — Simpson & Simpson, PLLC

(57) ABSTRACT

A torsional vibration damper with a friction device. The friction device is formed on at least one friction surface on two contra-rotationally and oppositely disposed disc parts that are in frictional contact with one another. In order to propose how to determine the initial stressing effect of the frictional action independently of external support of the disc parts, the frictional surfaces are pressurized against one another by means of at least one spring element.

16 Claims, 4 Drawing Sheets

TORSIONAL VIBRATION DAMPER

CROSS-REFERENCE TO RELATED APPLICATIONS

This application claims priority from German Patent Application No. 10 2009 008 670.6, filed Feb. 12, 2009, and German Patent Application No. 10 2009 042 051.7, filed Sep. 17, 2009, which applications are incorporated herein by reference in their entirety.

FIELD OF THE INVENTION

The invention relates to a torsional vibration damper.

BACKGROUND OF THE INVENTION

Torsional vibration dampers with friction devices have been available for a long time, and are used particularly in the drive trains of motor vehicles with a drive unit such as an internal combustion engine subjected to torsional-vibration stress. To generate frictional torque, diaphragm springs find application; they are supported on a component that is axially fixed and axially pressurizes two disc parts with friction surfaces against one another, wherein one disc part can be assigned to the output part and the other disc part respectively assigned to the input part, or at least to an intermediate part that is a multi-stage series-connected torsional-vibration damper. Alternatively, the diaphragm spring can be accommodated on a disc part fixed in circumferential direction and its force-transmitting edge may feature a friction surface that generates frictional torque on a friction surface of the other disc part. In this case, the disc parts must be supported axially, respectively, on other components in order to counteract the axial force of the diaphragm spring and centering means for the diaphragm spring must be provided. Furthermore, the unit costs of the diaphragm springs are high because of large amounts of punching scrap incurred because the diaphragm spring must be disposed on a large circumference to achieve high frictional torque.

BRIEF SUMMARY OF THE INVENTION

Object of the invention is therefore to propose a torsional vibration damper that features a friction device without a diaphragm spring.

In view of that, a torsional vibration damper according to the invention is proposed with two disc parts disposed oppositely to one another, against the effect of at least one energy accumulator in a rotatably limited manner, and a friction device is interposed between the latter, which is effective under relative rotation of the disc parts, wherein the friction device is formed by at least a friction surface provided on either disc part and which pressurizes two friction surfaces at least axially against one another, by means of at least a spring element, wherein the extension of the spring element in circumferential direction assumes an angle range less than 360°; thus dispensing with a diaphragm spring in the friction device. In this manner, the extension of the spring element in circumferential direction entails the arch length that corresponds to the maximum dimension of the spring element in circumferential direction, with an angular range that corresponds to the length of said arch. Preferably, the spring element has at least a support surface on which the spring force exerted by the spring element is transmitted into a disc part.

The torsional vibration damper can feature several damper stages, for instance two working in series, which can be formed by energy accumulators with different stiffness coefficients active in circumferential direction. Said stages can be flange parts mounted as discs that rotate relative to one another; they can respectively pressurize energy accumulators, for instance, in one direction, and upon rotation of flange parts relative to one another, the energy accumulator, for instance, compresses the coil springs via their face side. A flange part can be captured by the input part and the other by the output part and the friction device can be interposed between the two flange parts. To manufacture a multiple-stage serially connected damper, in which one damper stage is activated at greater angles than the other one, a floating, intermediate flange can be provided between the output- and input side flange parts. The friction device can be provided between the output side and the intermediate flange and/or the input side and the intermediate flange.

In one embodiment, the spring element exerts spring force on both disc parts in such a manner that the latter are pressed against each other, and hence, in case of relative rotation of both disc parts, frictional torque is generated depending on the spring force, among others. The spring element is advantageously disposed in the external circumference area of the disc parts, wherein the frictional torque can be increased among others.

The spring force and hence the frictional torque can be influenced by the stiffness of spring element or its geometry, if necessary. For instance, the stiffness depends on the spring element material as well as on spring element's geometrical formation, among others, and determines the spring force depending on the deflection of supporting surface relative to a basic state of the spring element, which then exists when the spring force is zero. Furthermore, the spring rate can be influenced by the grip length, as the distance between projected mid-point of supporting surface on the fixing plane and the mid-point of supporting surface facing the fastening element. In a further embodiment, several spring elements are purposefully distributed over the circumference. In particular, at least two spring elements have the same radial distance from a common rotation axis. Furthermore, at least two spring elements disposed over the circumference produce equal magnitudes of frictional torque. In a further advantageous embodiment, at least two spring elements can produce different magnitudes of frictional torque. Through the spring force applied to the disc parts by several spring elements, resultant frictional torque is developed as total of the respective individual frictional torque values, thus increasing the effectiveness of the friction device.

In a further embodiment, the frictional torque of the friction device can be influenced by the relative rotation angle of both disc parts. By introducing a changing thickness on one disc part, for instance, in the form of a ramp-shaped embossing change of depth in the mating area, thus meaning, on the surface of respective disc parts swept through by the support surface of the spring element during relative rotation of both disc parts, it is possible to vary the spring force in dependence upon the angle of relative rotation of both disc parts. Thickness change in contact area should be continuous in an ideal case, so that the spring element can slide on corresponding surfaces of the disc parts. Advantageously, the cross-sectional shape of the spring element is rounded in the supporting surface area in order to provide wear-resistant connection between spring element and disc part as well as sliding-capability with respect to relative rotation.

In one embodiment, the spring element is a kind of clamp in particular with U-shaped form. The clamp, for instance, consisting of spring steel is pushed over two axially adjacent components of the disc parts, with a friction surface respectively, and exerts spring force on the latter, with which frictional torque can be developed, which does not require additional external disc parts' axial support. On the contrary, the parts are subjected to mutual bracing. At the same time, the clamp is preferably disposed with its opening pointing outwards radially, so that loss of the clamp under the effect of centrifugal force is ruled out.

In one embodiment, the spring element is punched, such that its manufacture is cost-effective because of reduced punching scrap in comparison with the manufacture of conventional diaphragm springs. The spring elements are formed advantageously after punching and then hardened subsequently. The assembly of clamps on input- or output part undercut and, if necessary, formation of positive locking can be facilitated by introducing feed slants at the ends of clamp chicks.

In one embodiment, the spring element is indirectly or directly fixed on a disc part particularly by a person skilled in the art of interconnection technology known for this purpose, for instance, clamping-, riveting- or screw connection with suitable fastening elements. In doing so, the spring element can be fixed advantageously on corresponding components by form closure to develop the friction device even under low bracing so that the possibility is ruled out that a spring element may fall off. Furthermore, the spring element can be disposed on the side surface of a disc part. Advantageously, the spring element is disposed on a rivet element, for instance, on a rivet element formed as spacing part.

In order to dispose the spring element non-rotatably relative to at least one disc part advantageously, two fastening elements spaced apart can be provided on the spring element. Thereby, the two fastening elements can also have different shapes, in that, for instance, the one, a rivet and the other, a fastening element together depict a lift-up in the disc part and a complementary recess in the spring element. Alternatively, a limit stop can be provided, for instance, on a disc part such that the spring element is connected rotatably relative to the corresponding disc part, within defined limits and that rotary motion beyond the limits is limited by the limit stop.

In one embodiment, at least two cutouts can be provided in the spring element in which at least two rivets of an element can be added complementarily, while the rivet element on the other hand is fixed at least on one disc part. The spring element can at the same time be clamped advantageously between the disc part and rivet element. In a preferred embodiment, the spring element is formed such that it can be fixed on the spacing part between two disc parts and the latter spacing part upheld at a definite distance. In particular, the spring element can be attached to several spacing parts. Further advantages and advantageous embodiments of the invention are object of the following figures as well as their descriptive parts in whose depiction scaled reproduction was dispensed with for the sake of clarity.

BRIEF DESCRIPTION OF THE SEVERAL VIEWS OF THE DRAWING

The nature and mode of operation of the present invention will now be more fully described in the following detailed description of the invention taken with the accompanying drawing figures, in which.

DETAILED DESCRIPTION OF THE INVENTION

Figure 1:
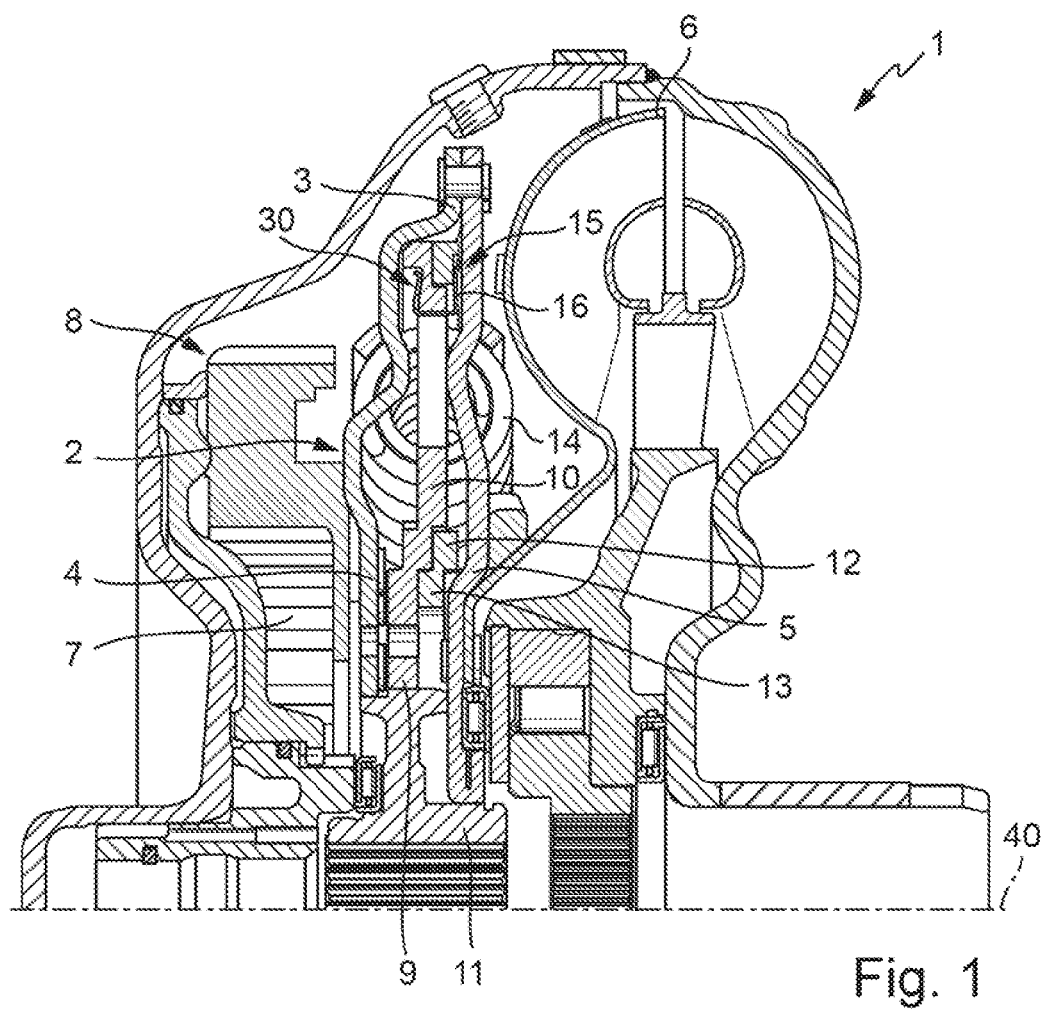
FIG. 1 shows a partial section through a hydrodynamic torque converter with torsional vibration dampers according to the invention.

FIG. 1 shows the upper half of a hydrodynamic torque converter 1 disposed around a rotation axis 40 with a torsional vibration damper 2 disposed in its housing in sectional view. The torsional vibration damper 2 features an input part 3 formed by two disc parts 4, 5, which is connected with the turbine wheel 6 and the output part 7 of the converter lock-up clutch 8. The output part 9 of the torsional vibration damper 2 is formed by the disc part 10 formed as a hub-flange and fixedly connected with the hub 11 that feeds the torque into the transmission input shaft (not shown). The disc part 13 formed as an intermediate flange 12 is disposed floating between the disc parts 4, 5, 10 and accommodates the energy accumulators 14 that are respectively distributed over the circumference and which can be disposed in different manners to form several damper stages, for instance, they can be pressurized for different torsional angles of disc parts 4, 5, 10, or they can feature different stiffness values and/or they can be nested inside one another.

In order to prevent the torsional vibration damper 2 from swinging up, in particular in the depicted exemplary embodiment of the intermediate flange 12 under rotational irregularities of engine torque, a friction device 15 is provided between the disc parts 10, 13, thus between the output part 9 of the torsional vibration damper 2 and the intermediate flange 12. The friction device 15 is formed by a spring element 30 in form of a clamp 16 that axially braces both disc parts 10, 13 with one another and develops frictional torque between the friction surfaces provided on the disc parts 10, 13, as soon as both disc parts 10, 13 are rotated against one another, as this is the case, for instance, upon introduction of rotational irregularities in the torsional vibration damper 2. At the same time, the frictional torque is developed in parallel to the effect of the energy accumulators 14, so that a hysteresis in their load characteristic is developed versus the torsional distance that counteracts a swing up of the intermediate flange 12, since the latter is retarded relative to the output part 9.

Figure 2:
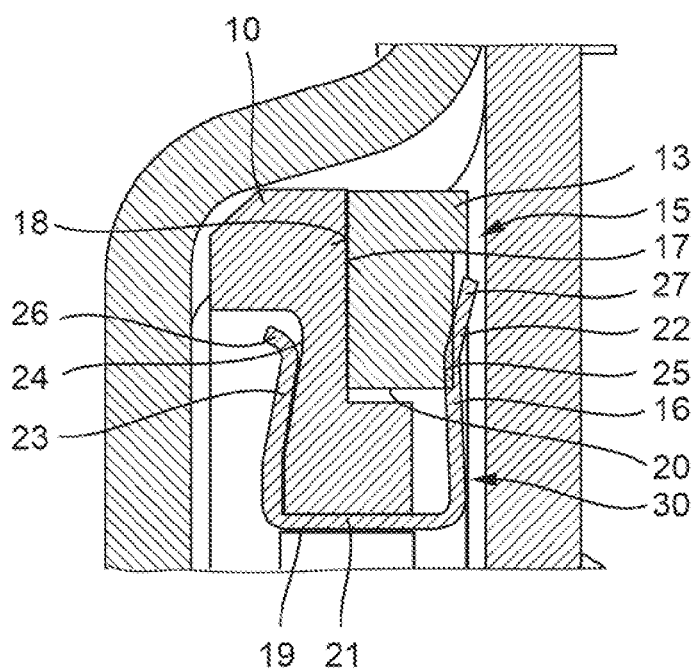
FIG. 2 shows a detail of the torsional vibration damper depicted in FIG. 1 with a friction device according to the invention.
Figure 3:
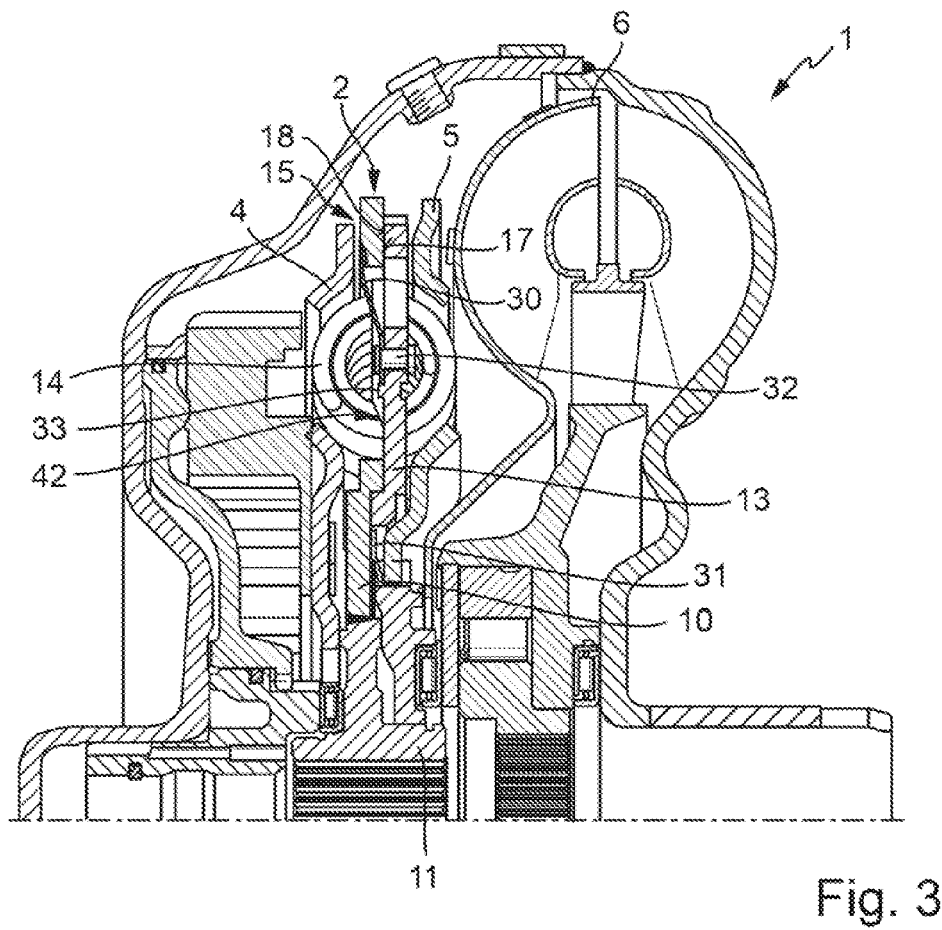
FIG. 3 shows a partial section through a hydrodynamic torque converter with a further torsional vibration damper according to the invention.

FIG. 2 shows a cutout from FIG. 1 for detailed illustration of the friction device 15. The two disc parts 10, 13 disposed coaxially contrarotatably feature friction surfaces 17, 18 respectively, facing one another and tensioned by several clamps 16 axially pre-stressed and distributed over the circumference. The clamps 16 are accommodated in cutouts 19, 20 of the disc parts 10, 13 and at least suspended on a disc part 10, 13 secured against rotation and loss. As such, they are fitted preferably—as depicted—with their opening outwards, so that they can be supported radially on the cutout 19 by means of the clasp 21 under the effect of centrifugal force. The chicks 22, 23 exert the pre-stressing force against both friction surfaces 17, 18. In disc parts 10, 13, undercuts 24, 25 are provided to secure the clamp 16 from getting lost. For easy assembly, the chicks 22, 23 of the clamp 16 feature insertion slants 26, 27. FIG. 3 shows the upper sectional half of a hydrodynamic torque converter 1 disposed around a rotation axis with a torsional vibration damper 2 disposed in its housing according to a further embodiment. The spring element 30 is connected with the disc part 13 in a form-closed manner, by means of a fastening element 32, on the side surface 42 in the radial outer area. Thus, on the spring element 30, a cutout is provided, through which the fastening element 32 extends. In order to establish a non-rotatable link to the disc part 13, a further fastening element 33 is provided in the form of a pick-up on the side surface 42 of the disc part 13, said pick-up fits in a complementary recess on the spring element 30. For axial centering of the disc parts 10, 13 is an additional spring element 31 disposed in the radial inner area of the side disc parts 10, 13, for instance, the latter is formed as a diaphragm spring. In doing so, the spring element 31 should be disposed possibly radially inside in order to keep its dissipated foreign friction, in the torsional vibration dampers, 2 low.

Figure 4:
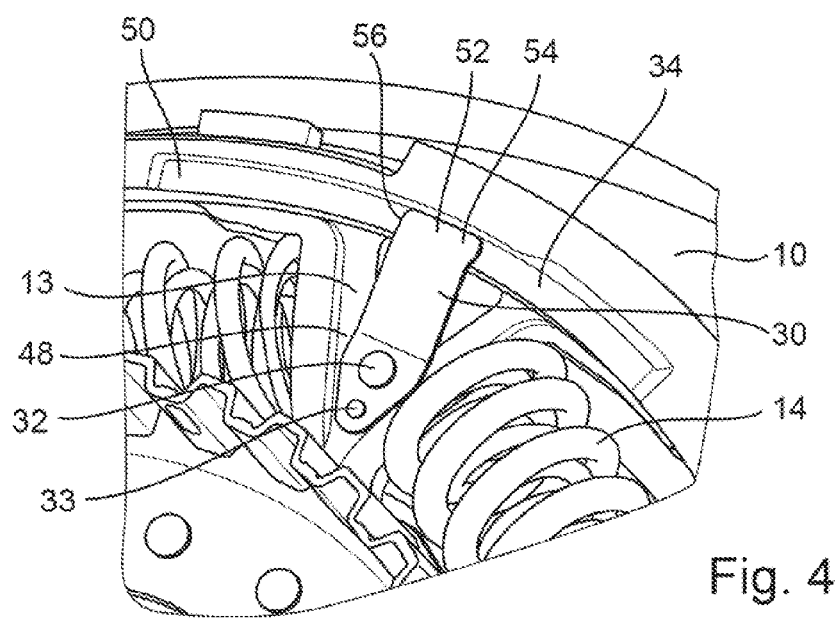
FIG. 4 shows a detail of the torsional vibration damper depicted in FIG. 3 with a friction device according to the invention.

FIG. 4 shows a detail of the torsional vibration damper 2 depicted in FIG. 3 with a friction device according to the invention. The spring element 30 is attached to the disc part 13 with the help of the fastening element 32. As such, it is disposed sunken in a cutout 48 of the disc part 13 in order to obtain a possibly small axial assembly space of the torsional vibration damper 2. The spring element 30 presses the disc part 13 with a spring force on the disc part 10 in order to generate frictional toque resulting from relative rotation of the two disc parts 10, 13. Since the frictional torque increases proportionally to the increase of the radial distance of the supporting surface 52 from the rotation axis and because it is advantageous to maximize the frictional torque with low prestress of the spring element, the spring element 30 and its support surface 52 is disposed in a radial outer area of both disc parts 10, 13.

To reduce the axial assembly space of the friction device 15, the support area 50 on the disc part 10, on which the support surface 52 of the spring element 30 slides during relative rotation of both disc parts 10, 13, is incorporated, sunken in the disc part 10. In that case, the incorporated, sunken support area 50 can feature different depths of sink, circumferentially, so that the spring element 30, when sliding on the support surface 52 depending on the contarotational angle of the two disc parts 10, 13 relative to one another, exerts a different spring force on both disc parts 10, 13. This angular dependency of spring force, for instance, is established by a ramp-shaped and particularly continuous changing thickness 34 in the disc part 10 when sliding on the support surface 52. In doing so, the formation of changing thickness 34 should possibly be continuous circumferentially, so that small shearing forces act on the spring element 30 in the plane, normal to the spring force. In the support surface 52 of spring element 30, circumferentially opposite, respectively in the side area 56, minted forms 54, for instance, spoon-shaped are provided, which facilitate perfect sliding of the support surface 52 on the support area 50 without the spring element 30 jamming particularly in the ramp-shaped area—changing thickness 34.

Figure 5:
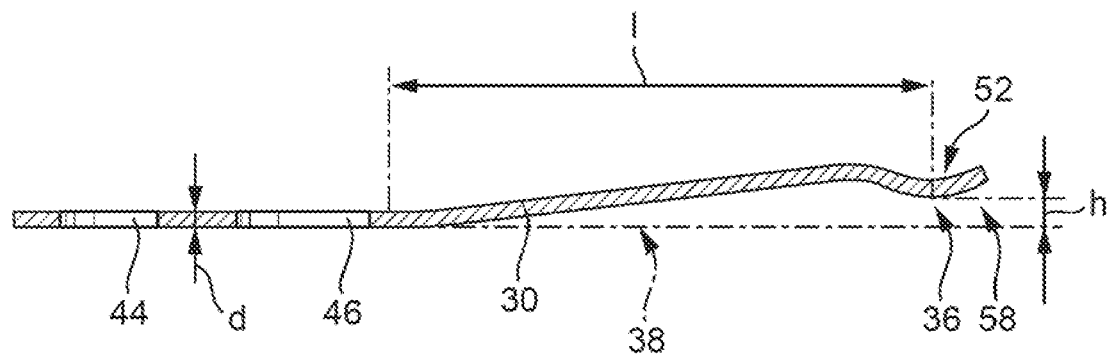
FIG. 5 shows a cross-sectional view of the spring element depicted in FIGS. 3 and 4

FIG. 5 depicts the spring element 30 from FIG. 4 in a radial cross-section view. The set-up height h of the spring element 30 as the distance between the plane of the support surface 58 and the fixing plane 38 can be subdivided first of all such that a set-up height denotes the basic state of the spring element 30 without pre-stress spring force, thus the non-deformed state and not the state when it is mounted on the disc part, which depends on the initial bent form of the spring element.

Furthermore, the set-up height changes through the assembly of the spring element 30 on the two disc parts 10, 13 and during relative rotation of the two disc parts 10, 13 through the ramp-shaped—changing thickness 34—section. In that case, the set-up height h in basic spring element state should be chosen such that adequate spring force acts on both disc parts whilst accounting for component tolerances, particularly of both disc parts 10, 13 and, thus, sufficient frictional torque is generated by the friction device 15.

Furthermore, the sensitivity of the spring force may be influenced depending, for instance, on the set-up height h by means of the grip length l as the distance between the midpoint of the support surface 52 projected on the fixing plane 38 and the mid-point of the fastening element facing the support surface or if necessary its complementary cutout 46 in spring element 30. The thickness of the spring element d is selected suitably based on the requirements with respect to assembly space dimensions, the production method based on spring element 30 and the material properties as well as the desired stiffness of the spring element. A rounded surface 36 of spring element 30 provided on the support surface 52 causes wear-resistant and smooth connection with respect to relative rotation of both disc parts 10, 13, between the spring element 30 and disc part 10.

Figure 6:
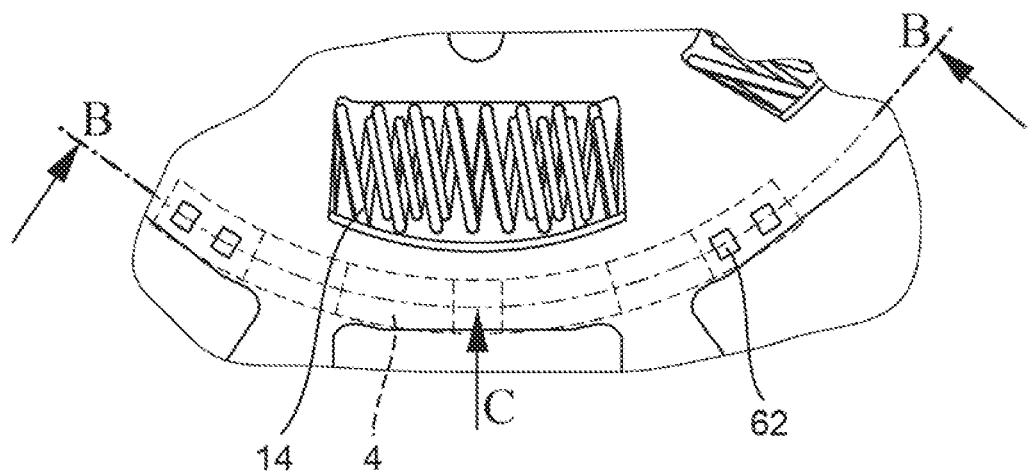
FIG. 6 shows a partial view of a further torsional vibration damper according to the invention in two different embodiments.
Figure 7:
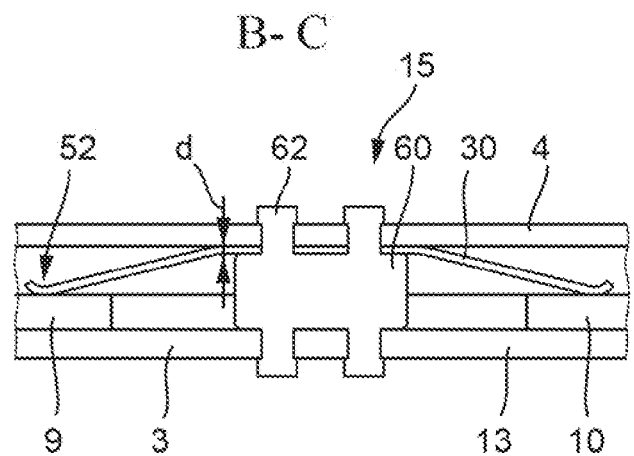
FIG. 7 shows a cross section through the torsional vibration damper along B-C from FIG. 6 in a first embodiment.

In FIG. 6, the cutout of a torsional vibration damper 2 with two other different embodiments according to the invention is depicted in plan. FIG. 7 shows a cross-section of the torsional vibration damper 2 along the line B-C from FIG. 6 in the first embodiment. The torsional vibration damper 2 features an input part 3 formed by two disc parts 4, 13 that accommodates the energy accumulator 14s that are distributed over the circumference. The output part 9 of the torsional vibration damper 2 consists of the disc part 10, which is formed as a hub-flange.

To prevent swing up of the torsional vibration damper 2 in the event of rotational irregularities of engine torque, a friction device 15 is disposed between the disc parts 10, 13, thus between the output part 9 of the torsional vibration damper 2 and the input part 3. The friction device 15 is formed by a spring element 30 and a rivet element 60 in the form of a spacing element that axially connects both disc parts 4, 13 with one another whilst the spring element 30 braces both disc parts 10, 13 axially and frictional torque is generated between friction surfaces 17, 18 provided on the disc parts 10, 13, as soon as both disc parts 5, 10 are contra-rotated; this, for instance, is the case when rotational irregularities are input into the torsional vibration damper 2. At the same time, the frictional torque is developed parallel to the effect of the energy accumulator 14, so that a hysteresis in its force characteristic is developed versus the torsional distance that counteracts a swing up effect of the output part 9, since the latter is retarded relative to the input part 3.

Figure 8:
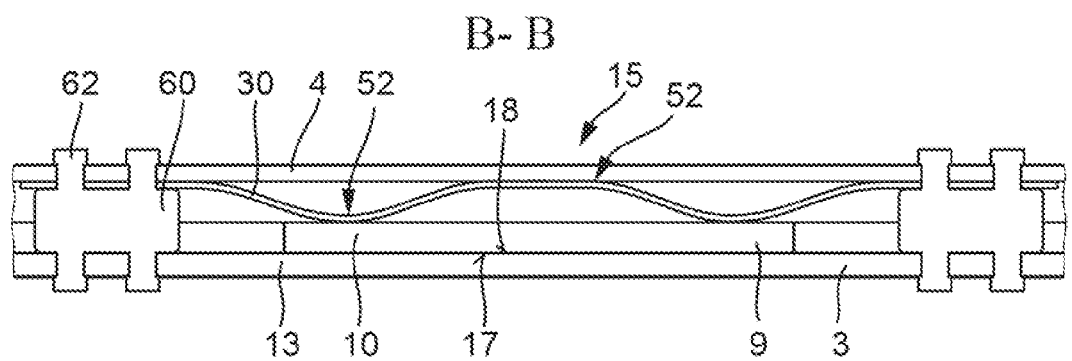
FIG. 8 shows a cross section through the torsional vibration damper along B-B from FIG. 6 in a second embodiment.

The spring element 30 has two recesses in which two rivets 62 can be impressed complementarily in order to dispose the spring element 30 non-rotatably. The rivets 62 are again attached to the rivet element 60, and they particularly form a common part with the latter. The rivet element 60 serves as spacing part in order to hold both disc parts 4, 13 at a definite axial distance apart and is particularly connected non-rotatably with the latter. The spring element 30 is clamped between the disc part 4 and the rivet element 60 with which the latter is fixed indirectly or if necessary directly on both disc parts 4, 13. The set-up height of the spring element must thereby be suitably selected in order to be able to develop an adequate spring force on the disc part 10 despite spacing between the disc part 4 and the disc part 10 defined by the rivet element 60. To keep the axial assembly space of the torsional vibration damper 2 as small as possible, axially viewed, suitably small spacing parts in the form of rivet elements 60 can be used, since the thickness of the spring element 30 in the assembly shown here still flows into the overall axial assembly length. The radially required assembly space of the spring element 30 can be reduced in that this is punched in a manner that it obtains an arched shape when viewed in plan. FIG. 8 shows a cross-section of the torsional vibration damper 2 along the line B-B from FIG. 6 in a further second embodiment of the friction device.

The spring element 30 is disposed on several rivet elements 60 and has a wavy structure when viewed in cross-section, in order to increase the spring force and the support surface 52 on the disc part 10, 11.

LIST OF REFERENCE SYMBOLS 1 torque converter
2 torsional vibration damper
3 input part
4 disc part
5 disc part
6 turbine wheel
7 output part
8 converter lock-up clutch
9 output part
10 disc part
11 hub
12 intermediate flange
13 disc part
14 energy accumulator
15 friction device
16 clamp
17 friction surface
18 friction surface
19 cutout
20 cutout
21 clasp
22 chick
23 chick
24 undercut
25 undercut
26 feed slant
27 feed slant
30 spring element
31 spring element
32 fastening element
33 fastening element
34 thickness change
36 rounded surface
38 fixing plane
40 rotation axis
42 side surface
44 recess
46 recess
48 depression
50 support area
52 support surface
54 embossing
56 side area of spring element
58 plane of support surface
60 rivet element
62 rivet
h set-up height
l grip length
d thickness of spring element

What we claim is:

1. A torsional vibration damper (2), comprising:
first and second disc parts (10, 13) oppositely disposed to one another, against the effect of at least one energy accumulator (14) in a contra-rotatably limited manner; and
a friction device (15) interposed between the latter, which is effective during relative rotation of said first and second disc parts (10, 13), wherein:
said friction device (15) is formed by first and second friction surfaces (17, 18) on said first and second disc parts (10, 13) respectively;
the first friction surface is part of a first piece of material from which the first disc part is made;
the second friction surface is part of a second piece of material from which the second disc part is made;
the first friction surface is in direct contact with the second friction surface;
at least said friction surfaces (17, 18) are pressurized axially against one another by means of at least a spring element (30); and
an outer circumference of said spring element (30) in the circumferential direction spans an angular range smaller than 360°.

2. The torsional vibration damper (2) according to claim 1, wherein several spring elements (30) are distributed over the circumference.

3. The torsional vibration damper (2) according to claim 1, wherein several spring elements (30) are distributed over the circumference at equal radial spacing intervals.

4. The torsional vibration damper (2) according to claim 1, wherein the spring element (30) can generate frictional torque between both the first and second disc parts (10, 13).

5. The torsional vibration damper (2) according to claim 4, wherein the spring element (30) has a geometry that enables the frictional torque to be influenced.

6. The torsional vibration damper (2) according to claim 4, wherein at least two spring elements (30) disposed over the circumference generate equivalent frictional torque magnitudes.

7. The torsional vibration damper (2) according to claim 4, wherein at least two spring elements (30) disposed over the circumference generate different frictional torque magnitudes.

8. The torsional vibration damper (2) according to claim 1, wherein the cross-sectional form of the spring element (30) in the area of the support surface (52) features a rounded surface (36).

9. The torsional vibration damper (2) according claim 1, wherein the spring element (30) is a clamp (16), in particular with U-shaped form.

10. The torsional vibration damper (2) according claim 1, wherein the spring element (30) is fixed indirectly or directly on a disc part (10, 13), in particular by means of a clamp-, rivet- or screw connection.

11. The torsional vibration damper (2) according to claim 10, wherein the spring element (30) is disposed non-rotatably relative to at least one of the first or second disc parts (10, 13).

12. A torsional vibration damper, comprising:
an axis of rotation;
at least one energy accumulator;
first and second disc parts engaged with the at least one energy accumulator and forming an input;
a third disc part engaged with the at least one energy accumulator, forming an output, and including a first surface disposed radially outward of the at least one energy accumulator;

a fourth disc part engaged with the at least one energy accumulator and including a second surface in contact with the first surface;
at least one spring device fixedly connected to one of the third or fourth disc parts and in contact with the other of the third or fourth disc parts to urge the first and second surfaces into contact, wherein each spring device is at least partially disposed in a respective space between a respective pair of adjacent energy accumulator and does not extend circumferentially beyond the respective space.

13. The torsional vibration damper of claim 12 wherein:
the other of the third or fourth disc parts includes a portion with first and second circumferential ends and a third surface disposed between the first and second circumferential ends;
an axial thickness of the portion diminishes in a circumferential direction from the first circumferential end to the second circumferential end; and,
the at least one spring device is in contact with the third surface.

14. The torsional vibration damper of claim 13 wherein as the one of the first or second disc parts rotates with respect to the other of the third or fourth disc parts in the circumferential direction, a pressure from the at least one spring element urging the first and second surfaces into contact diminishes.

15. A torsional vibration damper, comprising:
at least one energy accumulator;
first and second disc parts engaged with the at least one energy accumulator and forming an input;
a third disc part engaged with the at least one energy accumulator, forming an output, and including a first surface;
a fourth disc part connected to a hub so as to rotate in unison with the hub, engaged with the third disc part, at least partially rotatable with respect to the third disc part, and including a second surface in contact with the first surface;
at least one spring device in contact with the third disc part; and,
at least one fastening device fixedly connecting the at least one spring device to the first disc part and axially disposed between the first and fourth disc parts, wherein the at least one spring device urges the first and second surfaces into contact.

16. The torsional vibration damper of claim 15 wherein:
the at least one fastening device fixedly connects the at least one spring device to the fourth disc part; or,
a portion of the at least one fastening device is circumferentially aligned with the third disc part; or,
the at least one fastening device forms at least part of a solid path between the first and fourth disc parts.

* * * * *